US012326003B2

(12) United States Patent
Ylikangas et al.

(10) Patent No.: US 12,326,003 B2
(45) Date of Patent: *Jun. 10, 2025

(54) BUILDING PANEL

(71) Applicant: Välinge Innovation AB, Viken (SE)

(72) Inventors: Roger Ylikangas, Lerberget (SE); Anders Nilsson, Helsingborg (SE); Karl Quist, Höganäs (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,686

(22) Filed: Oct. 25, 2023

(65) Prior Publication Data

US 2024/0191516 A1 Jun. 13, 2024

Related U.S. Application Data

(63) Continuation of application No. 17/524,952, filed on Nov. 12, 2021, now Pat. No. 11,834,845, which is a (Continued)

(30) Foreign Application Priority Data

Sep. 24, 2019 (EP) .................................... 19199234

(51) Int. Cl.
*E04F 15/00* (2006.01)
*B27G 13/14* (2006.01)
(Continued)

(52) U.S. Cl.
CPC ........ *E04F 15/02038* (2013.01); *B27G 13/14* (2013.01); *B27M 3/0066* (2013.01); (Continued)

(58) Field of Classification Search
CPC .......... E04F 15/02033; E04F 15/02038; E04F 15/107; E04F 15/102; E04F 2201/042; (Continued)

(56) References Cited

U.S. PATENT DOCUMENTS 5,597,024 A 1/1997 Bolyard et al.
6,497,079 B1 12/2002 Pletzer et al.
(Continued)

FOREIGN PATENT DOCUMENTS

CA 2218237 A1 5/1998
CN 101314231 A 12/2008
(Continued)

OTHER PUBLICATIONS

U.S. Appl. No. 18/629,046, filed Apr. 8, 2024, Christian Boo.
(Continued)

*Primary Examiner* — Chi Q Nguyen
(74) *Attorney, Agent, or Firm* — Boone IP Law

(57) ABSTRACT

Building panels, such as a floor panels or wall panels, which include a first mechanical locking system at respective parallel and opposite third and fourth edges, such as long edges, configured to cooperate for horizontal and vertical locking between two adjacent building panels, preferably by a folding motion. The panels further include a second locking system at respective parallel and opposite first and second edges, such as short edges, configured to cooperate for horizontal and vertical locking of two adjacent building panels. An upper edge portion of one of the third edge or fourth edge, preferably the third edge, includes a first lower lip portion configured to cooperate with a first upper lip portion of an upper edge portion of the other of the third and fourth edge of an adjacent panel when the third and fourth edges are arranged in locking engagement.

19 Claims, 9 Drawing Sheets

Related U.S. Application Data continuation of application No. 16/738,725, filed on Jan. 9, 2020, now Pat. No. 11,203,877.

(51) Int. Cl.
*B27M 3/00* (2006.01)
*B27M 3/06* (2006.01)
*E04F 15/02* (2006.01)

(52) U.S. Cl.
CPC ....... *B27M 3/06* (2013.01); *E04F 2201/0146* (2013.01); *E04F 2201/0153* (2013.01); *E04F 2201/0161* (2013.01); *E04F 2201/023* (2013.01); *E04F 2201/043* (2013.01); *E04F 2201/044* (2013.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 2201/044; E04F 15/02005; E04F 2201/0115; E04F 2201/0161; E04F 2201/026; E04F 2201/027; B27G 13/14; B27M 3/0066; B27M 3/06
See application file for complete search history.

(56) References Cited

U.S. PATENT DOCUMENTS

| | | | | |
|---|---|---|---|---|
| 6,772,568 | B2 | 8/2004 | Thiers et al. | |
| 7,721,503 | B2 | 5/2010 | Pervan et al. | |
| 7,762,293 | B2 | 7/2010 | Pervan | |
| 8,511,031 | B2 | 8/2013 | Bergelin et al. | |
| 8,631,622 | B2 | 1/2014 | Baert et al. | |
| 8,833,028 | B2 | 9/2014 | Whispell et al. | |
| 9,322,183 | B2 * | 4/2016 | Pervan | E04F 15/02038 |
| 9,458,634 | B2 | 10/2016 | Derelov | |
| 11,203,877 | B2 | 12/2021 | Ylikangas et al. | |
| 11,479,976 | B2 * | 10/2022 | Ylikangas | E04F 15/102 |
| 11,591,804 | B2 * | 2/2023 | Ylikangas | E04F 15/02038 |
| 11,834,845 | B2 * | 12/2023 | Ylikangas | B27M 3/06 |
| 11,987,992 | B2 * | 5/2024 | Boo | E04F 13/0894 |
| 2005/0210810 | A1 | 9/2005 | Pervan | |
| 2008/0028713 | A1 | 2/2008 | Pervan et al. | |
| 2008/0134607 | A1 | 6/2008 | Pervan et al. | |
| 2009/0133353 | A1 | 5/2009 | Pervan et al. | |
| 2010/0058590 | A1 | 3/2010 | Braun et al. | |
| 2011/0167744 | A1 | 7/2011 | Whispell et al. | |
| 2012/0266555 | A1 | 10/2012 | Cappelle | |
| 2013/0042564 | A1 * | 2/2013 | Pervan | E04F 15/02038 52/582.2 |
| 2013/0192158 | A1 | 8/2013 | Cappelle et al. | |
| 2013/0283720 | A1 | 10/2013 | Pervan et al. | |
| 2014/0250813 | A1 * | 9/2014 | Nygren | E04F 15/107 52/309.15 |
| 2014/0283466 | A1 | 9/2014 | Boo | |
| 2015/0330088 | A1 | 11/2015 | Derelov | |
| 2016/0138274 | A1 | 5/2016 | Anspach et al. | |
| 2016/0237695 | A1 | 8/2016 | Pervan | |
| 2016/0340913 | A1 * | 11/2016 | Derelov | A47B 47/00 |
| 2017/0370109 | A1 | 12/2017 | Devos | |
| 2018/0010342 | A1 | 1/2018 | Van Hooydonck | |
| 2018/0094441 | A1 | 4/2018 | Boo | |
| 2018/0119429 | A1 | 5/2018 | Schulte | |
| 2019/0017278 | A1 | 1/2019 | De et al. | |
| 2019/0017279 | A1 | 1/2019 | Norwood et al. | |
| 2019/0211569 | A1 | 7/2019 | Boo et al. | |
| 2019/0271165 | A1 | 9/2019 | Boo | |
| 2020/0181923 | A1 * | 6/2020 | Quist | E04F 15/02155 |
| 2020/0318360 | A1 | 10/2020 | De Rick | |
| 2020/0353722 | A1 | 11/2020 | Naeyaert et al. | |
| 2021/0087827 | A1 | 3/2021 | Ylikangas et al. | |
| 2021/0087828 | A1 | 3/2021 | Ylikangas et al. | |
| 2021/0087829 | A1 | 3/2021 | Ylikangas et al. | |
| 2021/0087830 | A1 | 3/2021 | Ylikangas et al. | |
| 2022/0025657 | A1 * | 1/2022 | Pervan | E04F 15/102 |
| 2022/0127850 | A1 | 4/2022 | Boo | |
| 2022/0178150 | A1 * | 6/2022 | Ylikangas | B27M 3/06 |
| 2022/0298802 | A1 | 9/2022 | Ylikangas et al. | |
| 2022/0316219 | A1 | 10/2022 | Boo | |
| 2023/0235571 | A1 * | 7/2023 | Larsson | E04F 15/02038 52/586.1 |

FOREIGN PATENT DOCUMENTS

| | | | |
|---|---|---|---|
| CN | 101687335 | A | 3/2010 |
| CN | 204263297 | U | 4/2015 |
| CN | 105658883 | A | 6/2016 |
| CN | 108789746 | A | 11/2018 |
| CN | 114502807 | A | 5/2022 |
| DE | 202015101572 | U1 | 4/2015 |
| DE | 102014103176 | A1 | 9/2015 |
| EP | 0727292 | A1 | 8/1996 |
| PL | 197416 | B1 | 3/2008 |
| WO | 2006/043893 | A1 | 4/2006 |
| WO | 2007/015669 | A2 | 2/2007 |
| WO | 2008/004960 | A2 | 1/2008 |
| WO | 2008/148324 | A1 | 12/2008 |
| WO | 2009/116926 | A1 | 9/2009 |
| WO | 2014/108129 | A1 | 7/2014 |
| WO | 2015/135533 | A1 | 9/2015 |

OTHER PUBLICATIONS

U.S. Appl. No. 18/788,647, filed Jul. 30, 2024, Christian BOO.
European Search Report and Search Opinion received for European Application No. 19199233.8, mailed on Apr. 3, 2020, 9 pages.
Extended European Search Report issued in EP 19199234.6, Apr. 1, 2020, European Patent Office, Munich, DE, 8 pages.
International Search Report and Written Opinion issued in PCT/EP2020/050443, Jun. 26, 2020, European Patent Office, Rijswijk, NL, 23 pages.
U.S. Appl. No. 16/738,602, filed Jan. 9, 2020, Roger Ylikangas.
U.S. Appl. No. 17/642,348, filed Mar. 11, 2022, Roger Ylikangas.
U.S. Appl. No. 17/505,229, filed Oct. 19, 2021, Christian Boo.
U.S. Appl. No. 17/709,930, filed Mar. 31, 2022, Christian Boo.
U.S. Appl. No. 18/061,706, filed Dec. 5, 2022, Christian Boo.
U.S. Appl. No. 18/146,602, filed Dec. 27, 2022, Roger Ylikangas.
U.S. Appl. No. 18/966,070, filed Dec. 2, 2024, Roger Ylikangas.

* cited by examiner

A-A

B-B

C-C

D-D

A-A

BUILDING PANEL

CROSS REFERENCE TO RELATED APPLICATIONS

The present application is a continuation of U.S. application Ser. No. 17/524,952, filed on Nov. 12, 2021, now U.S. Pat. No. 11,834,845, which is a continuation of U.S. application Ser. No. 16/738,725, filed on Jan. 9, 2020, now U.S. Pat. No. 11,203,877, which claims the benefit of European Application No. 19199234.6, filed on Sep. 24, 2019. The entire contents of U.S. application Ser. No. 17/524,952, U.S. application Ser. No. 16/738,725, and European Application No. 19199234.6 are hereby incorporated herein by reference in their entirety.

TECHNICAL FIELD

The disclosure generally relates to the field of building panels.

BACKGROUND

Laminate flooring usually comprise a core of a 6-12 mm fibre board, a 0.2-0.8 mm thick upper decorative surface layer of laminate and a 0.1-0.6 mm thick lower balancing layer of laminate, plastic, paper or like material. A laminate surface comprises melamine-impregnated paper. The most common core material is fibreboard with high density and good stability usually called HDF—High Density Fibreboard. Sometimes also MDF—Medium Density Fibreboard—is used as core.

Laminate floor panels of this type have been joined mechanically by means of so-called mechanical locking systems. These systems comprise locking means, which lock the panels horizontally and vertically. The mechanical locking systems are usually formed by machining of the core of the panel. Alternatively, parts of the locking system may be formed of a separate material, for instance aluminium or HDF, which are integrated with the floor panel, i.e. joined with the floor panel in connection with the manufacture thereof.

The main advantages of floating floors with mechanical locking systems are that they are easy to install. They may also easily be taken up again and used once more at a different location. However, know systems suffer from drawbacks, for example in respect moisture control. As such, there is room for improvements in the technical field.

SUMMARY

An overall objective of the present disclosure is to provide a building panel which facilitates improved control of moisture, such as water. Improved moisture control may include not limited to improved sealing between assembled building panels, improved resistance to water penetration through a surface comprising assembled building panels.

It is a further object to provide a building panel which facilitates alignment of assembled such building panels.

It is thus a further object of the present invention to provide a building panel which facilitates improved moisture control of a lay of building panels, such as a floating floor. In particular, it is an object to provide a building panel for improving moisture control and/or at least reduce the possibility of water penetration of the T-joints of such floor lay.

The above objects of embodiments of the invention may be achieved wholly or partly by locking systems and floor panels according to the disclosure. Embodiments of the invention are evident from the description and drawings.

Definition of Some Terms

In the following text, the visible surface of the installed floor panel is called "front surface", while the opposite side of the floor panel facing the subfloor is called "rear surface". "Horizontal plane" relates to a plane, which is parallel to the front side. Directly adjoining upper parts of two neighboring joint edges of two joined floor panels together define a "vertical plane" perpendicular to the horizontal plane. The outer parts of the floor panel at the edge of the floor panel between the front surface and the rear surface are called "joint edge". As a rule, the joint edge has several "joint surfaces" which can be vertical, horizontal, angled, rounded, beveled, etc. These joint surfaces exist on different materials, for instance laminate, fiberboard, wood, plastic, metal (in particular aluminum) or sealing materials.

By "vertical locking" is meant locking parallel to the vertical plane. By "horizontal locking" is meant locking parallel to the horizontal plane.

By "up" is meant towards the front surface, by "down" towards the rear surface, by "inwardly" mainly horizontally towards an inner and centre part of the panel and by "outwardly" mainly horizontally away from the centre part of the panel.

By "locking" or "locking system" are meant cooperating connecting means which interconnect the floor panels vertically and/or horizontally. By "mechanical locking system" is meant that locking can take place without glue. Mechanical locking systems can in many cases also be joined by glue.

By "decorative surface layer" is meant a surface layer, which is mainly intended to give the floor its decorative appearance. "Wear resistant surface layer" relates to a high abrasive surface layer, which is mainly adapted to improve the durability of the front side. This conclude in that a "decorative wear resistant surface layer" is a layer, which is intended to give the floor its decorative appearance as well as improve the durability of the front side. A surface layer is typically applied to the core.

Embodiments of the present invention are particularly suitable for use in floating floors, which are formed of floor panels which are joined mechanically with a locking system integrated with the floor panel, i.e. mounted at the factory, are made up of one or more upper layers of wood or wood veneer, decorative laminate, powder based surfaces or decorative plastic material, an intermediate core of wood-fibre-based material or plastic material and preferably a lower balancing layer on the rear side of the core. Floor panels of solid wood or with a surface layer of cork, linoleum, rubber, or soft wear layers, for instance needle felt glued to a board, printed and preferably also varnished surface and floors with hard surfaces such as stone, tile and similar materials are included.

The following description of known technique, problems of known systems and objects and features of embodiments of the invention will therefore, as a non-restrictive example, be aimed above all at this field of application and in particular at panels formed as rectangular floor panels with long and shorts edges intended to be mechanically joined to each other on both long and short edges.

The long and short edges are mainly used to simplify the description of embodiments of the invention. The panels may be square. It should be emphasized that embodiments of the invention may be used in any floor panel, and it may be combined with all types of known locking system formed on the long edges and/or short edges, where the floor panels are intended to be joined using a mechanical locking system connecting the panels in the horizontal and/or vertical directions on at least two adjacent edges.

In one aspect of the invention there is provided a set of similar or essentially identical building panels, such as a floor panels or wall panels. The panels comprise a first mechanical locking system at respective parallel and opposite third and fourth edges being long edges of the panel. The first mechanical locking system comprises at the third edge a locking groove configured to receive a first locking tongue of a fourth edge of an adjacent panel by means of a folding displacement of the adjacent panel for vertical locking between two adjacent building panels. A second locking system at respective parallel and opposite first and second edges, such as short edges of the panel. The second locking system being configured to cooperate for horizontal and vertical locking of two adjacent building panels, preferably by means of a vertical motion, such as vertical folding. An upper edge portion of one of the third edge or fourth edge, preferably the third edge, comprises a first lower lip portion configured to cooperate with a first upper lip portion of an upper edge portion of the other of the third and fourth edge of an adjacent panel when said third and fourth edges are assembled in locking position. The first upper lip portion of the fourth edge is configured to form a tight fit around the first lower lip portion when the first lower lip portion is received under the first upper lip portion in response to said folding displacement. Further advantages and embodiments being set forth in the appended dependent claims and detailed description.

BRIEF DESCRIPTION OF DRAWINGS

The disclosure will in the following be described in connection to exemplary embodiments and in greater detail with reference to the appended schematic drawings, wherein.

DETAILED DESCRIPTION

Embodiments of the disclosure will now be described with reference to the appended schematic drawings. It should be emphasized that improved or different functions may be achieved using combinations of the embodiments.

All embodiments may be used separately or in combinations. Angles, dimensions, rounded parts, spaces between surfaces, etc. are only examples and may be adjusted within the basic principles of the invention.

Figure 1:
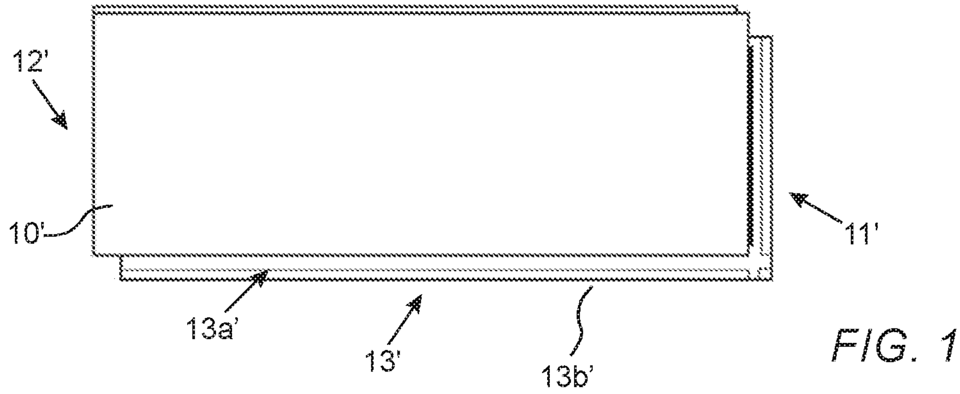
FIG. 1 shows a schematic illustration of a floor board comprising locking systems according to known technology.
Figure 2:
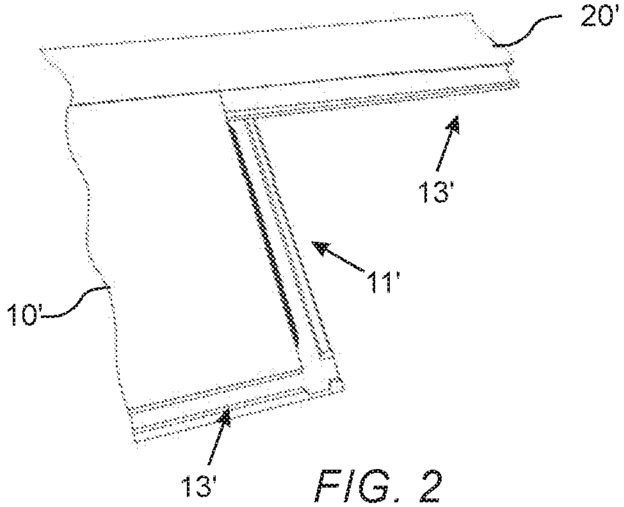
FIG. 2 shows a schematic illustration of the floor board of FIG. 1 in locked position with an adjacent building panel.

A known building panel comprising mechanical locking systems is illustrated in FIG. 1.

A mechanical locking system typically comprises a tongue and a tongue groove for vertical locking and a locking element and a locking groove for horizontal locking. It typically has at least four pairs of active cooperating locking surfaces, two pairs for vertical locking and two pairs for horizontal locking. The locking system comprises several other surfaces, which generally are not in contact with each other and can therefore be produced with considerably larger tolerance then the cooperating locking surfaces.

Laminate floorings are usually composed of a core consisting of a 6-9 mm fiberboard, a 0.20 mm thick upper surface layer and a lower balancing layer. The surface layer provides appearance and durability to the floor panels. The core provides stability, and the balancing layer keeps the board level when the relative humidity (RH) varies during the year.

Figure 3:
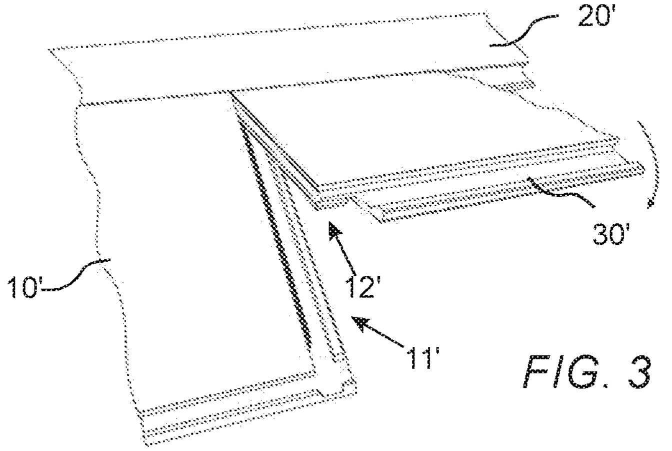
FIG. 3 shows a schematic illustration of a further floor board being assembled to the floorboards of FIG. 2 by means of a vertical motion (vertical folding).
Figure 4A:
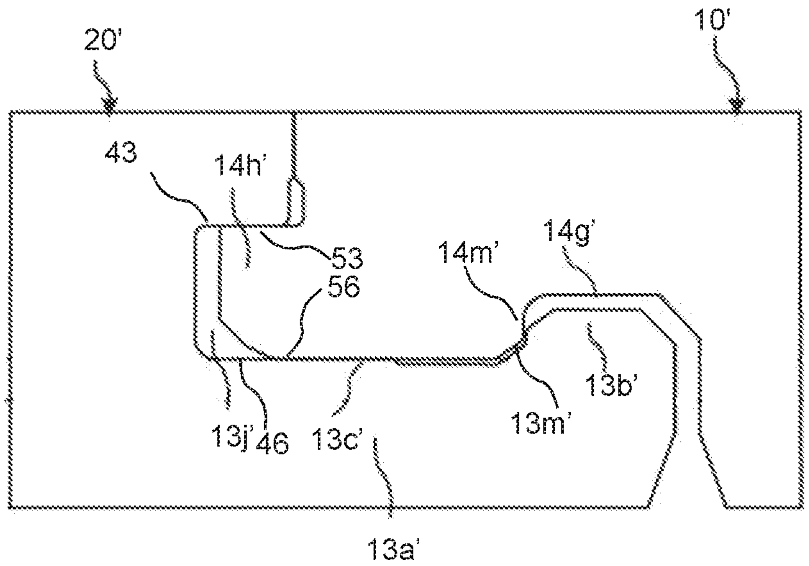
FIGS. 4A-4B show schematic illustrations of a cross sectional views of locking systems according to known technology.

FIG. 4A illustrates, according to known art, a typical first mechanical locking system (strip lock), which can be locked with angling (see FIG. 3), and which is widely used on the market, in particular for assembling respective long edges of panels to each other. FIG. 4A shows a vertical cross section of the floor panel is shown of a part of a long side 13' of the floor panel 20', as well as a part of a long side 14' of the floor panel 10'. The bodies of the floor panels 10', 20' can be composed of a fiberboard body or core, which supports here, a wear resistant and decorative surface layer on its front side and a balancing layer on its rear side (underside). The locking system has a tongue **14*h*' and a tongue groove 13*j*' which locks the panels in a vertical direction V with upper 53 and lower 56 tongue surfaces that cooperate with upper 43 and lower 46 tongue grooves surfaces. A locking strip 13*a*' is formed from the body and supports a locking element 13*b*'. Therefore the locking strip 13*a*' and the locking element 13*b*' in a way constitute an extension of the lower part of the tongue groove 13*j*'. The locking element 13*b*' formed on the strip 13*a*' has an operative locking element surface 13*m*' which cooperates with an operative locking groove surface 14*m*' in a locking groove 14*g*' in the opposite locking groove side of the floor panel 10'. By the engagement between the horizontal operative locking surfaces 13***m*', 14*m*' a horizontal locking of the floor panels 10', 20' transversely of the joint edge is obtained if the panels are pulled apart.

Figure 4B:
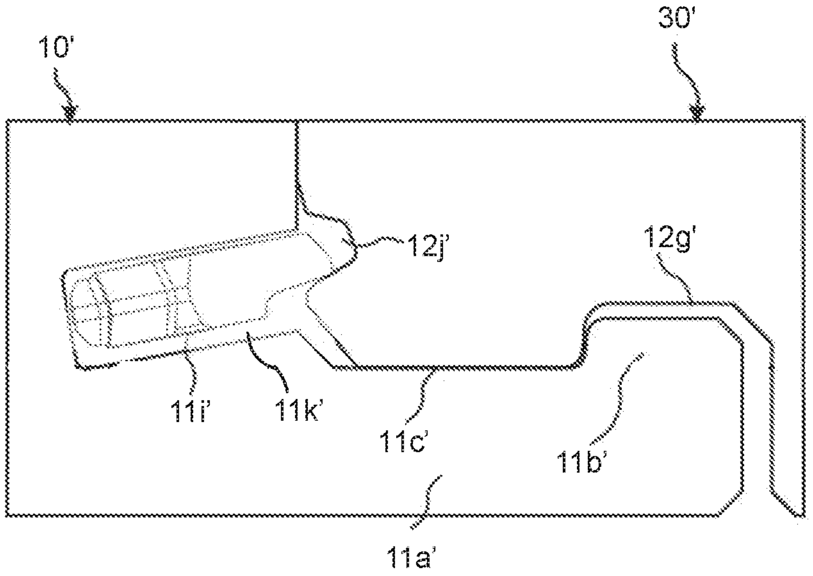

A known second locking system, shown in FIGS. 4B, can also be formed with a flexible tongue 11*i*' (fold lock) typically used at short edges 11', 12' as shown in FIGS. 4B, which can be displaced during locking. Such a locking system can be locked with a vertical movement as shown in FIG. 3 where the first edge 11' of panel 10' is assembled to the second edge 12' of panel 30' by means of a vertical motion.

The displaceable tongue 11*i*' is configured to cooperate with the second tongue groove 12*j*' for locking in a vertical direction. The displaceable tongue 11*i*' is a separate part and is made of, e.g., plastic, and inserted in a displacement groove 11*k*' at the first edge 11' of the first panel 10'. The tongue 11*i*' is pushed into a displacement groove 11*k*' during a vertical assembling of the first and the second edge of the first and the second panel. The displaceable tongue 11*i*' springs back and into the second tongue groove 12*j*' at the second edge 12' of the panel 30' when the panels have reached a locked position.

A third 13' and a fourth edge 14' of the respective panels are provided with the first locking system, which enables assembling to an adjacent panel 20' by an angling movement to obtain a simultaneous assembling of the first 11' and the second 12' edges and the third 13' and the fourth edges 14' as shown in FIG. 3.

FIGS. 4A-B show cross sections of different embodiments of the known locking systems during assembling of a first and a second panel 10', 20'.

Exemplary embodiments of the invention are shown in FIGS. 5A-5C and FIGS. 6 through 11.

Figure 5A:
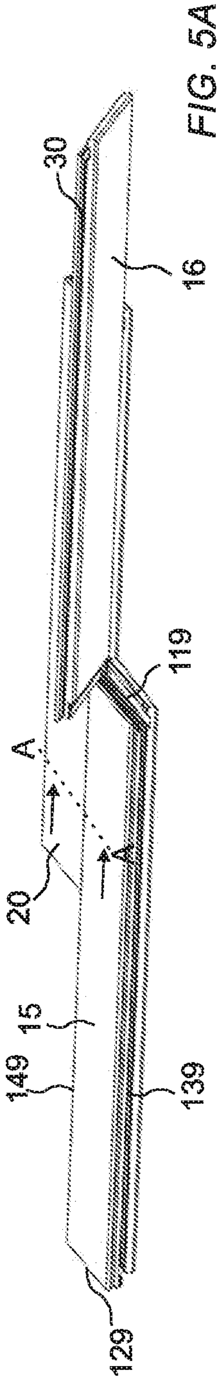
FIGS. 5A-5C show schematic illustrations a locking system according to embodiments of the invention.
Figure 5B:
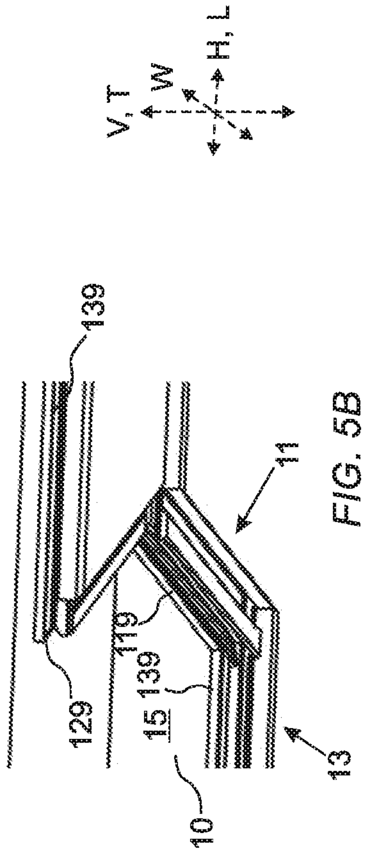
Figure 5C:
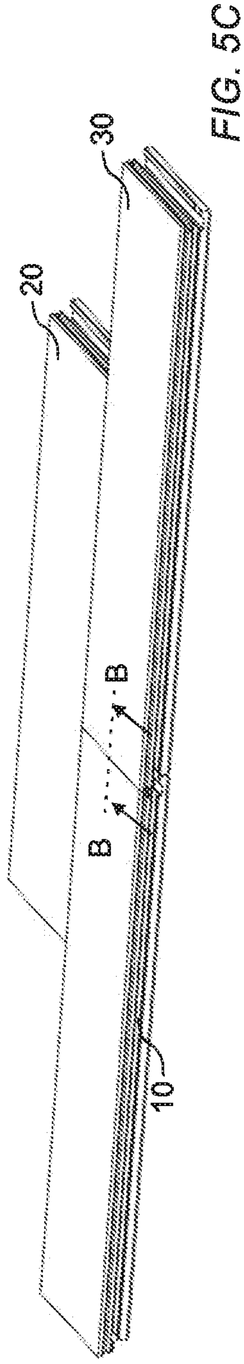
Figure 6:
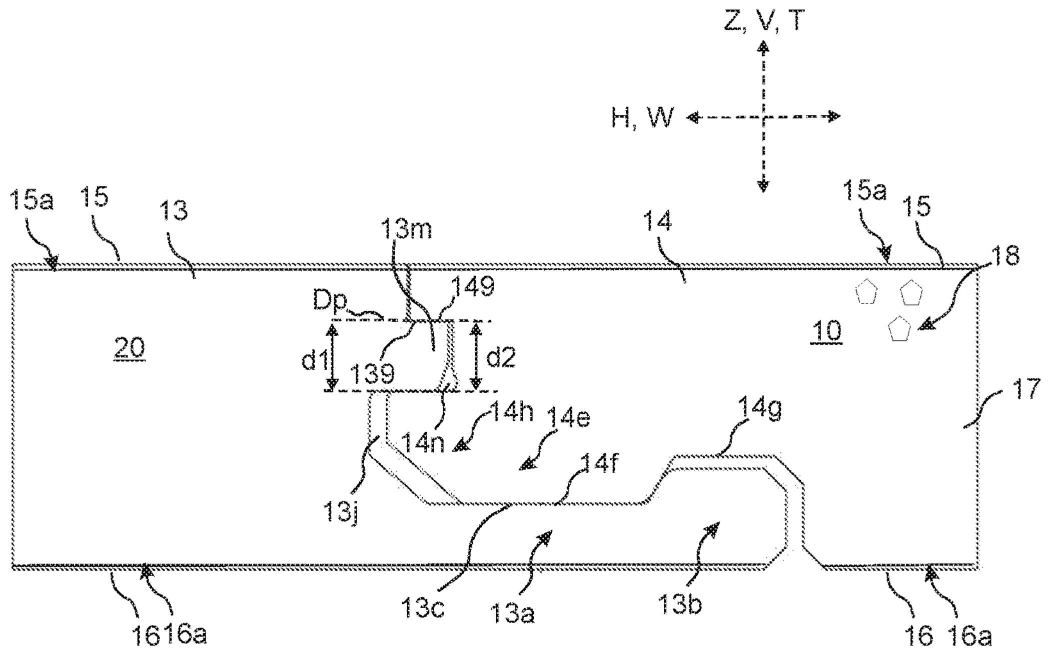
FIG. 6 shows a schematic cross-sectional view of the first locking system at the section A-A of FIG. 5A according to an embodiment of the disclosure.
Figure 7:
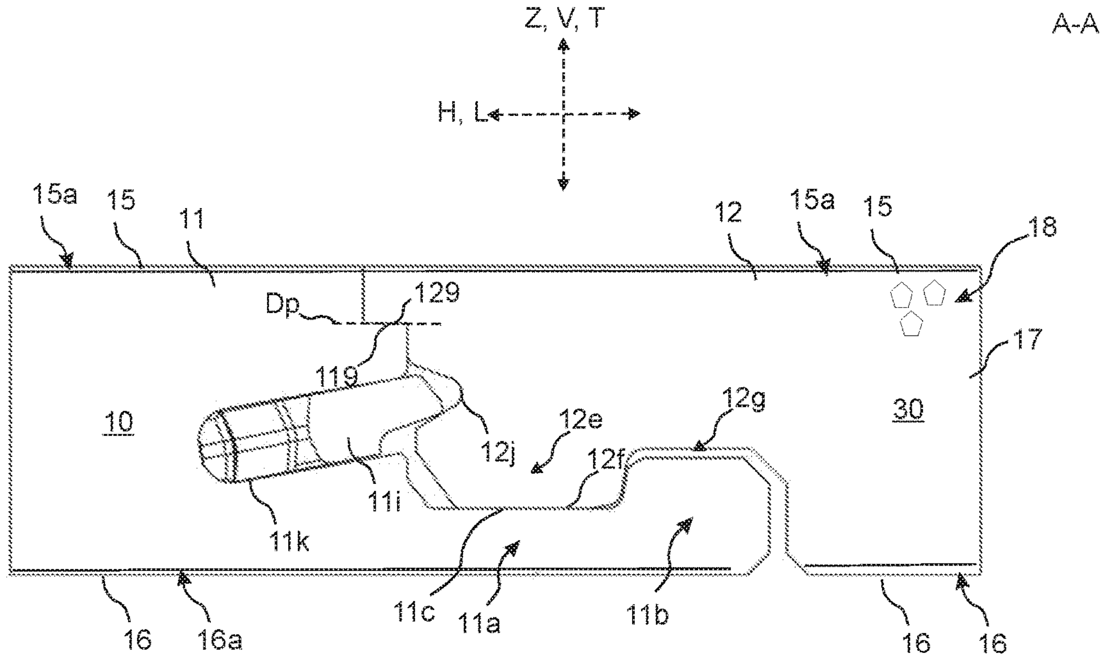
FIG. 7 shows a schematic cross-sectional view of the second locking system at the section B-B of FIG. 5C according to an embodiment of the disclosure.

Referring to FIGS. 5A-C, 6 and 7, a first mechanical locking system shown in FIG. 6 is formed with tongue 14*h* and groove 13*j* and configured to be assembled by means of an angling movement. The fourth edge 14 may comprise a first locking protrusion 14*e* in the shape of a locking tongue, provided with a first lower edge surface 14*f*. An embodiment of the second locking system is shown in FIG. 7, wherein the second edge 12 is provided with a second locking protrusion 12*e* which may be a locking tongue 12*h*, provided with a second lower edge surface 12*f*, preferably the first and second lower edge surfaces 12*f*, 14*f* are configured to cooperate with a respective of the first and second upper surfaces 11*c*, 13*c* of a first and a second locking strip 13*a*, 11*a* of adjacent panels, such as the second 20 panel shown in FIG. 6 and the third panel 30 as shown for instance in FIG. 7.

The first mechanical locking system may comprise a first tongue groove 13*j* at one of a third edge 13 or fourth 14 edge, for example the third edge 13, and a first locking tongue 14*h* at the other of the third or fourth edge, for example the fourth edge 14. The first locking tongue 14*h* and the first tongue groove 13*j* are configured to cooperate for locking of the third and the fourth edge 13, 14 in a vertical V direction. The first mechanical locking system may typically further comprise a first locking strip 13*a* at the third edge 13, provided with a vertically protruding first locking element 13*b*, a first locking groove 14*g* at a fourth edge 14. The first locking element 13*b* is configured to cooperate with the first locking groove 14*g* for locking of the third 13 and the fourth edge 14 in a horizontal direction, in particular away from each other and perpendicular said third and fourth edge.

The second mechanical locking system is preferably formed at one of a first 11 or second 12 short edge, such as a first edge, of similar, preferably essentially identical panels 10, 20, 30, 40, 50. The second mechanical locking system may be configured for locking the first edge 11 of the a first panel 10 to the second edge of an adjacent panel 30, in a plane, and in a vertical and/or in horizontal directions perpendicular said first and second edge towards and away from each other. An embodiment of the second mechanical locking system enables assembling of the first and the second panels by a vertical motion of the second edge of the adjacent panel 30 relative the first edge 11 of the first panel 10. Such vertical motion is shown for instance in FIGS. 10 and 11. The first and second mechanical locking systems are preferably formed by mechanical cutting, such as milling, drilling and/or sawing, of the edges of the panels and the second mechanical locking system may be provided with a displaceable tongue 11*i*, preferably of plastic. The displaceable tongue may be bendable and provided with protruding bendable parts, such as the displaceable tongues disclosed in WO2006/043893 and WO2007/015669. The displaceable tongue may also be configured to be locked by a movement along the first and the second edge, such as the displaceable tongues disclosed in WO2009/116926 and WO200/8004960.

Referring to FIG. 7. Embodiments of a second locking system may comprise a second locking tongue, which may be provided in the shape of a displaceable tongue 11*i* arranged in a displacement groove 11*k* for example at the first edge 11 of the first panel 10. The displaceable tongue 11*i* is configured to cooperate with a first tongue groove 12*j* formed at the other of the first 11 or second edge 12, for locking of the first and the second edge 11, 12 in a vertical V direction.

Figure 10:
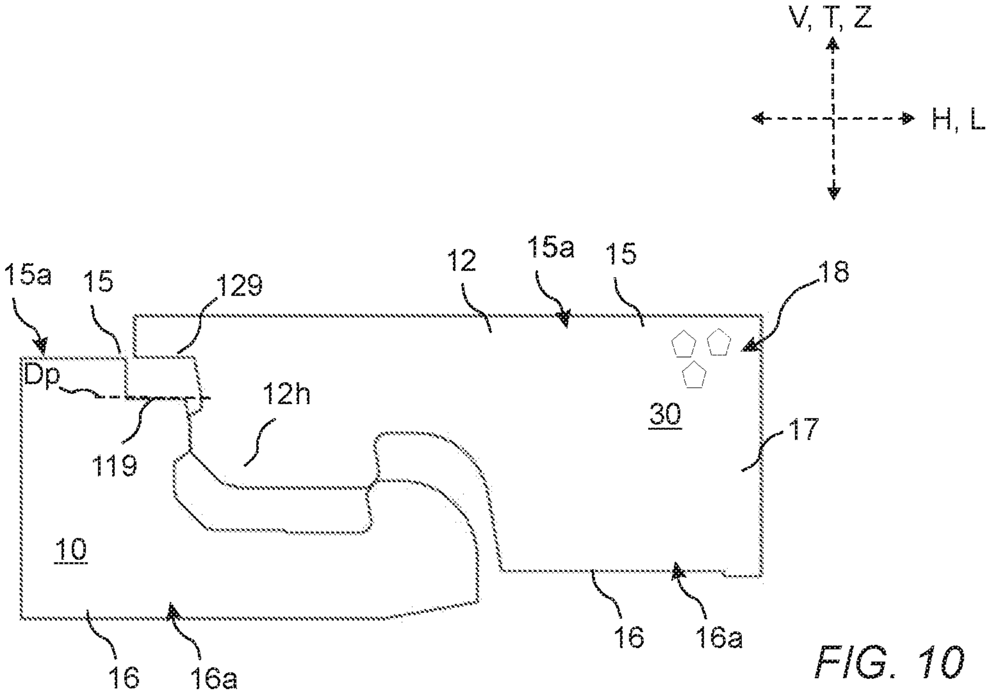
FIG. 10 shows a schematic illustration of the second locking system according to an embodiment being assembled by means of a vertical motion.
Figure 11:
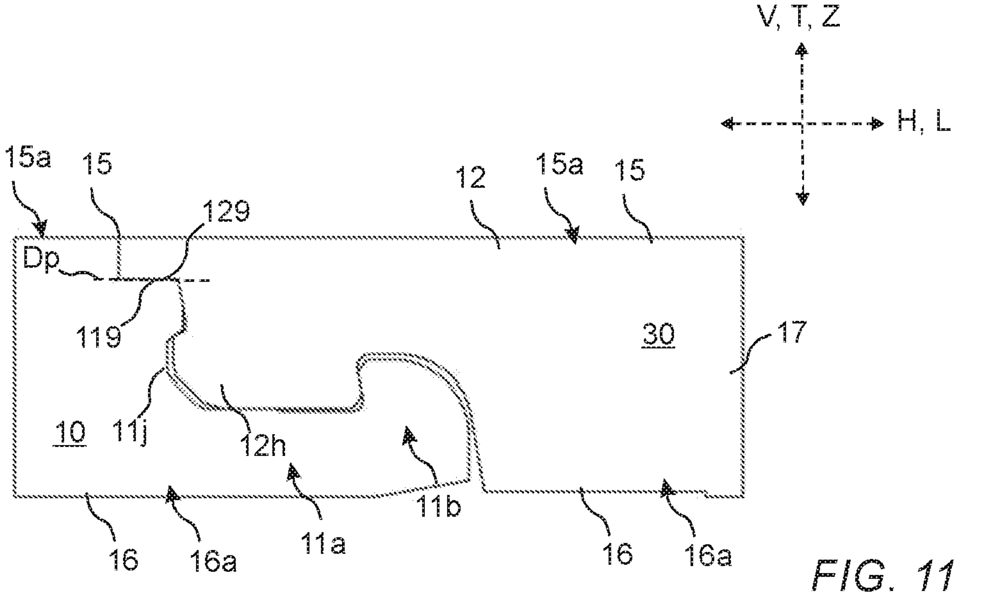
FIG. 11 shows a further schematic illustration of the second locking system of FIG. 10 being assembled by means of a vertical motion.

A further embodiment of the second locking system in shape of a one-piece solution combinable with the first locking system is shown in FIGS. 10 and 11.

As derivable from FIG. 6, an upper edge portion of one of a third or fourth edge 13, 14, which may be opposite parallel edges, such as the third edge 13, may comprise a planar surface portion, which may be provided in the shape of a first lower lip portion 139 configured to cooperate, including not limited to, to receive or mate with a complementary planar surface portion, which may be provided in the shape of a first upper lip portion 149, of an upper edge portion of the other of the third or fourth edge of an adjacent panel.

As derivable from FIG. 7, an upper edge portion of one of a first or second edge 11, 12, which may be opposite parallel edges, such as the first edge 11, may comprise a planar surface portion, which may be in the shape of a second lower lip portion 119 configured to cooperate, including not limited to, to receive or mate with a complementary planar surface portion, which may be provided in the shape of a second upper lip portion 129, of an upper edge portion of the other of the first or second edge of an adjacent panel.

An outermost portion of first upper lip portion 149 may be disposed inboard of outermost portion of first locking tongue 14*h*, as shown in FIG. 6.

An outermost portion of first lower lip portion 139 may be disposed inboard of outermost portion of first locking strip 13*a*, as shown in FIG. 6.

An outermost portion of first lower lip portion 139 may be disposed outboard of innermost portion of first tongue groove 13*j*, as shown in FIG. 6.

An upper edge portion of the fourth edge 14, preferably a long edge, may comprise a vertically extending edge portion extending from the front surface 15 followed by a bend, preferably a right-angle bend, inwards. Said bend followed by a horizontal planar surface, wherein said first upper lip portion 149 may comprise said horizontal planar surface. The vertically extending edge portion and the first upper lip portion may be perpendicular to each other, while the corner connecting the two portions may be rounded or beveled. Optionally, the horizontal planar surface may additionally form a datum surface. A datum surface may be a surface that contacts the adjacent panel, in locked position, and serves as a basis or guide to alignment of the panels to each other.

An upper edge portion of the third edge 13, preferably a long edge, may comprise a vertically extending edge portion extending from the front surface followed by a bend, preferably a right-angle bend, outwards. Said bend followed by a horizontal planar surface, wherein said first lower lip portion 139 may comprise said horizontal planar surface. The vertically extending edge portion and the first lower lip portion may be perpendicular to each other, while the corner connecting the two portions may be rounded. Optionally, the horizontal planar surface may additionally form a datum surface.

An upper edge portion of the second edge 12, preferably a short edge, may comprise a vertically extending edge portion extending from the front surface 15 followed by a bend, preferably a right-angle bend, inwards. Said bend followed by a horizontal planar surface, wherein said second upper lip portion 129 may comprise said horizontal planar surface. The vertically extending edge portion and the second upper lip portion may be perpendicular to each other, while the corner connecting the two portions may be rounded or beveled. Optionally, the horizontal planar surface may additionally form a datum surface.

An upper edge portion of the first edge 11, preferably a short edge, may comprise a vertically extending edge portion extending from the front surface 15 followed by a bend, preferably a right-angle bend, outwards. Said bend followed by a horizontal planar surface, wherein said second lower lip portion 119 may comprise said horizontal planar surface. The vertically extending edge portion and the second lower lip portion may be perpendicular to each other, while the corner connecting the two portions may be rounded. Optionally, the horizontal planar surface may additionally form a datum surface.

Outermost portion of second lower lip portion 119 may be disposed inboard of an outermost portion of second locking strip 11*a*, as shown in FIG. 7.

The second lower lip portion 119 may have an extension inboard of an innermost portion of the second tongue groove 11*j*, as shown in FIG. 11.

The second upper lip portion 129 may have an extension outboard of an outermost portion of the second locking tongue 12*h*, as shown in FIG. 11.

An outermost portion of second lower lip portion 119 may be disposed inboard of outermost portion of second locking tongue 11*i*, as shown in FIG. 7.

An outermost portion of second lower lip portion 119 may be disposed at least partially inboard of an opening of the second displacement groove 11*k*, as shown in FIG. 7.

Inboard may be synonymous with inwards of, in a direction towards the centre of the panel. Outboard may be synonymous with outwards of, in a direction away from the centre of the panel.

The upper and lower lips may each comprise a datum surface configured for aligning the front surface 15 of the panel with respective front surfaces 15 of adjacent panels to become flush with each other when assembled in locking position.

The upper and lower lips may be planar, in particular the lip portions may be planar and may extend in parallel. The lip portions may preferably extend in a plane parallel the front surface 15 of the panel. However, other configurations are perceivable, such as inclined in relation to the front surface 15.

The first upper lip portion 149 of the panel may be configured to bear and/or rest on the first lower lip portion 139 when adjacent panels are assembled in locking engagement. Thereby, improved sealing function is facilitated when the panel is assembled in locking position to one or more further panels by means of the first locking system.

The second upper lip portion 129 of the panel may be configured to bear and/or rest on the second lower lip portion 119 when adjacent panels are assembled in locking engagement. Thereby, improved sealing function is facilitated when the panel is assembled in locking position to one or more further panels by means of the second locking system.

The first and second lower lip portions 119, 139 may form a continuous right-angle with each other. The first and second upper lip portions 129, 149 may form the shape of a continuous right-angle with each other. The continuous right-angles may extend around respective diagonally opposite corners of the panel. The first and second lower and upper lip portions may form the shape of a continuous rectangle. The rectangle may extend along a circumference of the panel as shown in FIG. 5A.

The first and second lower lip portions 119, 139 may be configured to be underlying when engaging with a respective upper lip portion 129, 149. The first and second upper lip portions 129, 149 may be configured to be overlying when engaging with a respective lower lip portion 119, 139.

Accordingly, at least a portion of the lower lip portions 119, 139 may face in a direction upwards and at least a portion of the upper lip portions 129, 149 may face in a direction downwards.

The first edge 11 and the third edge 13 may each comprise a vertically extending surface extending from the front surface 15 of the panel. The lower lip portions 119, 139 may in combination with the respective vertically extending surface form an inwards recessing shape, such as right-angled surface which recesses inwards.

The second edge 12 and the fourth edge 14 may each comprise a vertically extending surface extending from the front surface 15 of the panel The upper lip portions 129, 149 may in combination with the respective vertically extending surface form an outwards recessing shape, such as a right-angled surface which complements the respective inwards recessing lower lip portions, as shown in FIGS. 6-11.

The respective upper and/or lower lip portions may comprise a material which facilitates sealing, including, but not limited to, a polymer, rubber, silicone, adhesives, vax or like.

In a preferred embodiment, the respective first and second lower lip portions 119 and 139 are provided on the short first edge 11 and the long third edge 13 of the panel 10, and the respective first and second upper lip portions 129, 149 are provided on the short second edge 12 and the long fourth edge 14 respectively, as shown for instance in FIGS. 6, 7, 10 and 11.

Accordingly, by courtesy of that the respective first and second upper lip portions 129, 149 may cooperate with, including to bear on, the respective first and second lower lip portions 119, 139, the configuration may bring about the technical advantage that the weight of the panel urges the respective first and second upper lip portions 129, 149 towards the respective first and second lower lip portions 119, 139 thereby the weight of the panel may contribute to the sealing function and thus improved sealing may be facilitated.

This entails that in some embodiments, the first lower edge surface 14*f* and the first upper surface 13*c* of two adjacent panel may in some embodiments not abut each other when the two adjacent panels are in assembled in locking position. Thus, a gap may extend between at least part of the first lower edge surface 14*f* and the first upper surface 13*c* of two adjacent panels when assembled in locking position.

However, in some embodiments, the first lower edge surface 14*f* and the first upper surface 13*c* of two adjacent panel may abut each other when the two adjacent panels are in assembled in locking position by means of the first locking system.

Referring to FIG. 6, the first locking tongue 14*h*, the first tongue groove 13*j* and the first lip portions 139, 149 may be configured to bias the first upper lip portion 149 towards the first lower lip portion 139 when a respective third edge 13 and fourth edge 14 are assembled in locking position. This configuration may facilitate that the first upper lip portion 149 is always biased towards the first lower lip portion 139 when one or more panels are assembled in locking position.

The first locking system may comprise a first locking tongue 14*h* and a first tongue groove 13*j*. The first lower lip portion 139 is preferably disposed between the first tongue groove 13*j* and the front surface 15 of the panel. The first upper lip portion 149 is preferably disposed between the first locking tongue 14*h* and the front surface 15 of the panel.

Referring to FIG. 7, one of the first or second edge 11, 12, for example the first edge 11 may in some embodiments comprise a displaceable, preferably flexible tongue 11*i* configured to enable assembling of panels by means of vertical folding. The displaceable tongue 11*i* may be configured to cooperate with the second tongue groove 12*j* to thereby bias the second upper lip portion 129 against the second lower lip portion 119, thereby facilitating an improved sealing function.

The second locking system may comprise a second locking tongue 11*i*, 12*h* and a second tongue groove 12*j*, 11*j*. The second lower lip portion 119 is preferably disposed between the second tongue groove 12*j*, 11*j* and the front surface 15 of the panel. The second upper lip portion 129 is preferably disposed between the second locking tongue 11*i*, 12*h* and the front surface 15 of the panel.

As derivable for instance from FIGS. 6-11, the provision of a pair of lip portions, such as the first lower and upper lip portions 139, 149 and/or the second lower and upper lip portions 119, 129, each pair 119, 129; 139, 149 may respectively form a mechanical labyrinth seal. Thus, this configuration may particularly be advantageous for preventing moisture penetration between the edges 11, 12 and/or between edges 13, 14 respectively, such as between the front surface 15 to the locking tongue 11*i*, 12*h* or 14*h* or tongue groove 11*j*, 12*j*, 13*j* or from the front surface 15 to the rear surface 16.

Figure 8:
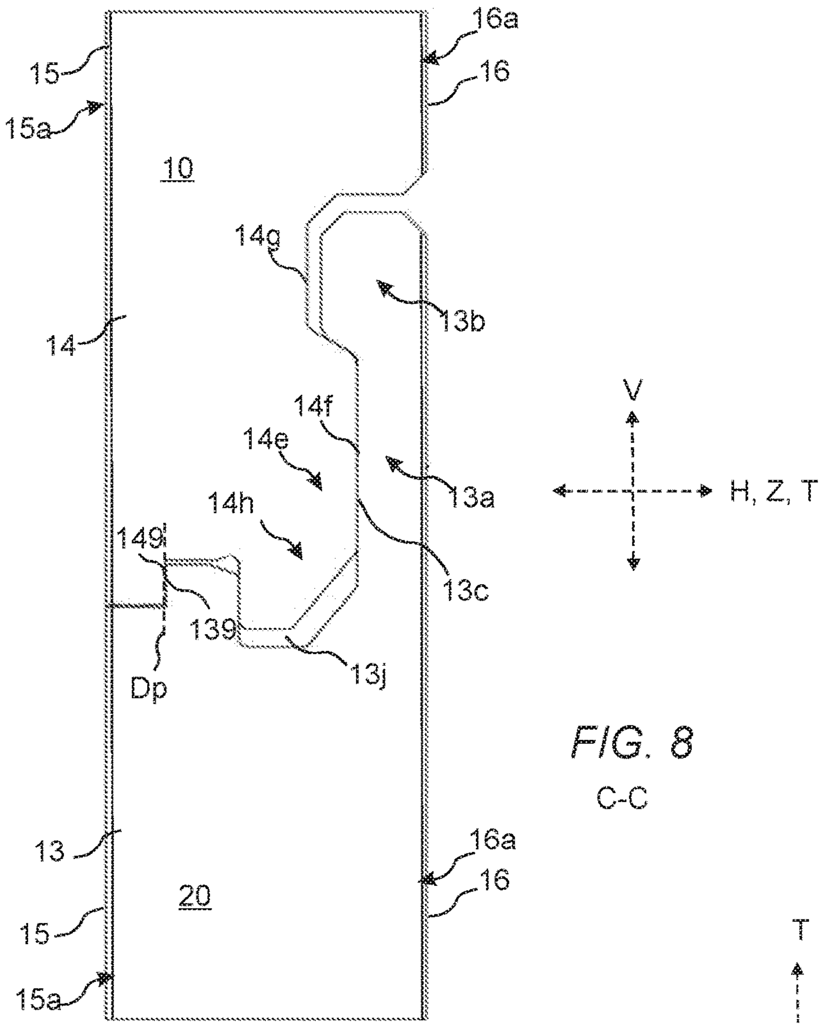
FIG. 8 is a schematic cross-sectional view of the first locking system at the section C-C of FIG. 12 according to an embodiment assembled as a wall.
Figure 12:
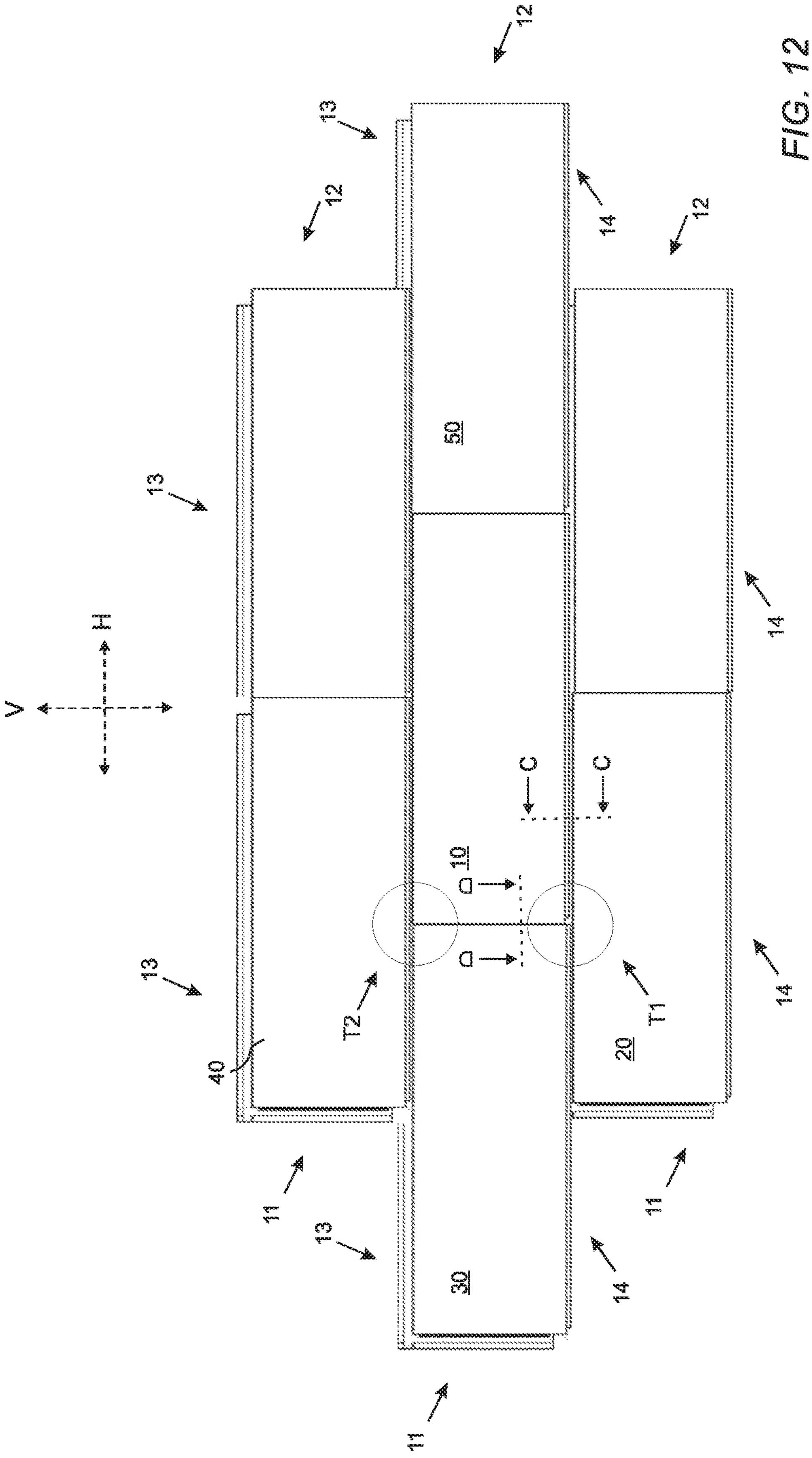
FIG. 12 is a schematic illustration of an exemplary embodiment assembled as a wall.

Referring to FIGS. 8 and 12 showing an exemplary embodiment where the panels are assembled as a wall, i.e. the panels are utilized as wall panels. The provision of the lip portions 119, 129 139, 149 between the locking tongue 11*i*, 12*h*, 14*h* and/or locking groove 11*j*, 12*j*, 13*j* and the front surface 15 may facilitate that one or more of the pair lip portions i.e. 119, 129; 139, 149, may provide mechanical obstacles e.g. for a fluid such as water. Thereby, a fluid such as water which flow along the front surface 15 in a vertically downwards direction, when acted upon by gravitational force, may be hindered from flowing passed the lip portions, such as the first lower lip portion 139 in a direction from the front surface 15 to the rear surface 16.

In particular the first lower lip portion 139, may provide, e.g. for a fluid such as water, a mechanical obstacle extending in a direction counter the direction of the gravitational force. Thereby, a fluid such as water which flow along the front surface 15 in a vertically downwards direction, when acted upon by gravitational force, will be hindered from flowing upwards and over the first lower lip portion 139.

The first lower lip portion 139 and the first upper lip portion 149 may mutually define a datum plane Dp as illustrated in FIG. 10.

The second lower lip portion 119 and the second upper lip portion 129 may mutually define a datum plane Dp as illustrated in FIG. 11.

The first, second, third and fourth lip portions 119, 129, 139, 149 may be configured to define a datum plane Dp.

The first, second, third and fourth lip portions 119, 129, 139, 149 may essentially extend in a common plane, which may be the datum plane Dp.

The datum plane Dp may facilitate alignment of the respective front surface 15 of adjacent panels when assembled in locking position such that the respective front surfaces 15 of adjacent panels are arranged flush with each other.

The first lower lip portion 139 may preferably be disposed between first tongue groove 13*j* and the front surface 15 of the panel. The first upper lip portion 149 may preferably be disposed between first locking tongue 14*h* and the front surface 15 of the panel.

As explained above and shown in FIG. 7, one of the first or second edges may according to embodiments comprise a second locking tongue 11*i*, such as a displaceable locking tongue configured to linearly translate in a displacement groove 11*k*, and the other of the first and second edges comprises a second tongue groove 12*j* for receiving said second locking tongue.

The second lower lip portion 119 may preferably be disposed at a vertical V position between second locking tongue 11*i* and the front surface 15 of the panel. The second upper lip portion 129 may preferably be disposed at a vertical V position between second tongue groove 12*j* and the front surface 15 of the panel.

Alternatively, as shown in FIGS. 10 and 11, the second lower lip portion 119 may be disposed at a vertical V position between a second tongue groove 11*j* of the first edge 11 and the front surface 15 of the panel. The second upper lip portion 129 may be disposed at a vertical V position between a second tongue 12*h* of the second edge 12 and the front surface 15 of the panel.

The first lower lip portion 139 may be contiguous with the second lower lip portion 119.

The first upper lip portion 149 may be contiguous with, preferably continuous with, the second upper lip portion 129.

The lip portions 119, 129, 139, 149 may be contiguous with each other such as to extend continuously along the first, second, third and fourth edges.

Courtesy of the lip portions 119, 129, 139, 149 being overlaying and underlying respectively in a complementary manner, they may continuously define the datum plane Dp along the first, second, third and fourth edges when a panel is assembled with similar panels in locking position along all edges 11, 12, 13, 14. Thereby, improved sealing may be facilitated.

The function of the lip portions may thus be twofold; having the function of aligning the respective front surfaces of the panels and/or providing the continuous seal along the circumference of the panel together with respective mating lip portions of adjacent panels when assembled in locking position on all four edges of the panel.

The lip portions may be formed contiguous with each other to thereby continuously define the datum plane Dp along the circumference of the panel. It is thereby achieved that when a panel is assembled in locking position with further essentially similar panels along all four edges, there is obtained continuous contact provided by mating or closed lip portions 119, 129; 139, 149 along essentially the entire, or the entire circumference of the panel. A continuous seal along the circumference of the panel may thus be facilitated.

Referring to FIG. 7, preferably, the edges of the panel which comprises a locking strip may comprise a respective lower lip portion i.e. the first edge 11 and the third edge 13.

Referring e.g. to FIGS. 6-7 and 10-11, preferably, the edges of the panel which comprises a locking strip may comprise a respective lower lip portion i.e. the first edge 11 and the third edge 13.

The panel 10 may comprise a surface layer 15*a* provided at the front surface 15 and preferably a backing layer 16*a* provided at the rear surface 16. Typically, the surface layer comprises a decorative layer configured to be visible when the panels are assembled to a flooring. Such decorative layer is well known in the art and may be provided in different forms, including but not limited to printed paper, powder, printed powder, or veneer, such as wood veneer. The surface layer, which may also provide a protective layer, typically comprising a binder resin, such as a thermosetting resin, which facilitates bonding, i.e., adhesion between, i.a., the decorative layer and the core of the panel. The binder may also facilitate bonding of one or more additives such as surface hardening particles and/or pigments in order to provide the surface layer with various properties. The binder may comprise, for example, Melamine Formaldehyde. The binder may penetrate into the core of the panel during manufacture of the panel, typically the binder is provided in powder form whereby it becomes liquid in response to exposure to heat. The binder may therefore penetrate into the core of the building panel. The core may for example comprise one of MDF, HDF, wood, stone, ceramics, PVC, plastics, other materials are contemplatable.

The binder may have a depth of penetration into the core of the panel, in the thickness direction Z, from the front surface 15 of the panel and into the core. This feature provides for improved sealing between the respective upper and lower lip portions.

The depth of penetration may be at least into the first lower and upper lip portions 139, 149. This provides for a more water-tight first locking system.

The depth of penetration may be at least into the second lower and upper lip portions 119, 129. This provides for a more water-tight second locking system.

Consequently, aspects of the present disclosure may be particularly suitable for use in wet spaces, such as bath rooms, kitchens or like.

Consequently, aspects of the present disclosure may be suitable for use as floor panels, as illustrated for instance in FIGS. 6-7, 10-11 and 13.

Figure 9:
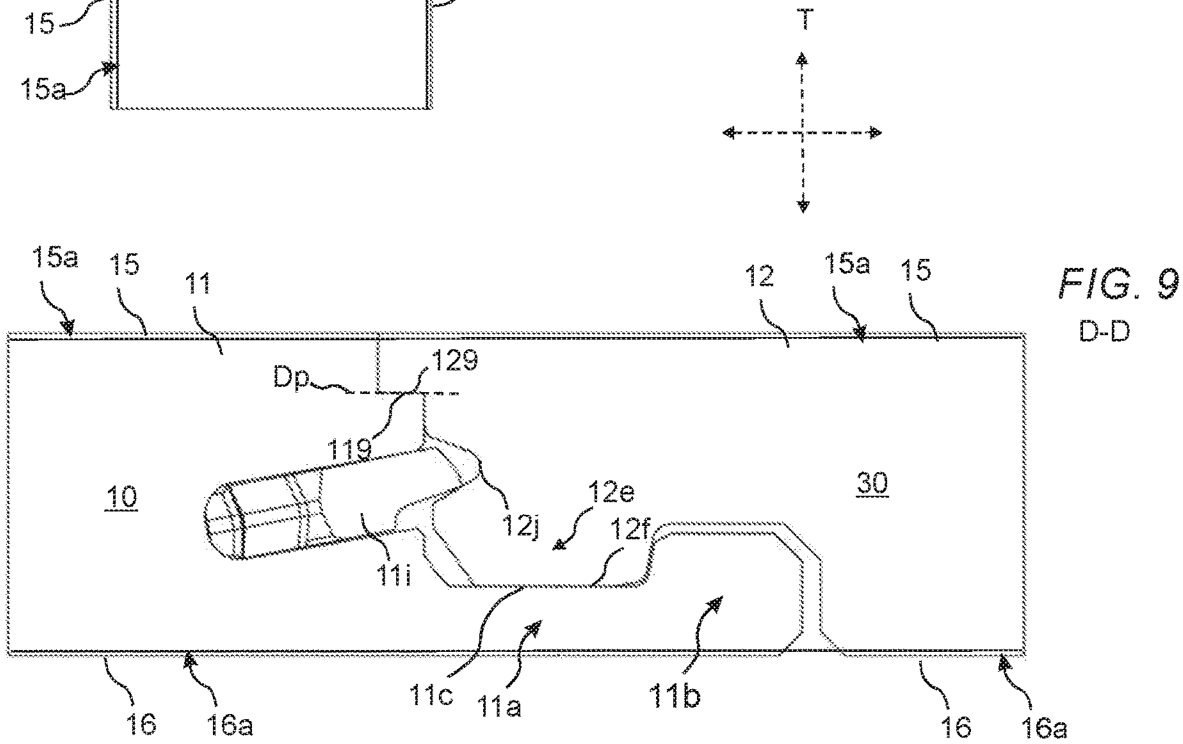
FIG. 9 is a schematic cross-sectional view of the first locking system at the section D-D of FIG. 12 according to an embodiment assembled as a wall.

Consequently, aspects of the present disclosure may be suitable for use as wall panels, as illustrated for instance in FIGS. 8-9 and 12.

It should be appreciated that the provision and configuration of the upper and lower lip portions 119, 129, 139, 149, as described herein, in particular configured to continuously along all the edges of a panel, is not limited to use in combination with a particular locking system, but may rather be implemented in combination with virtually any mechanical locking system and in building panels of any material. The above described locking system serving merely as exemplary embodiments of possible implementation forms.

Figure 13:
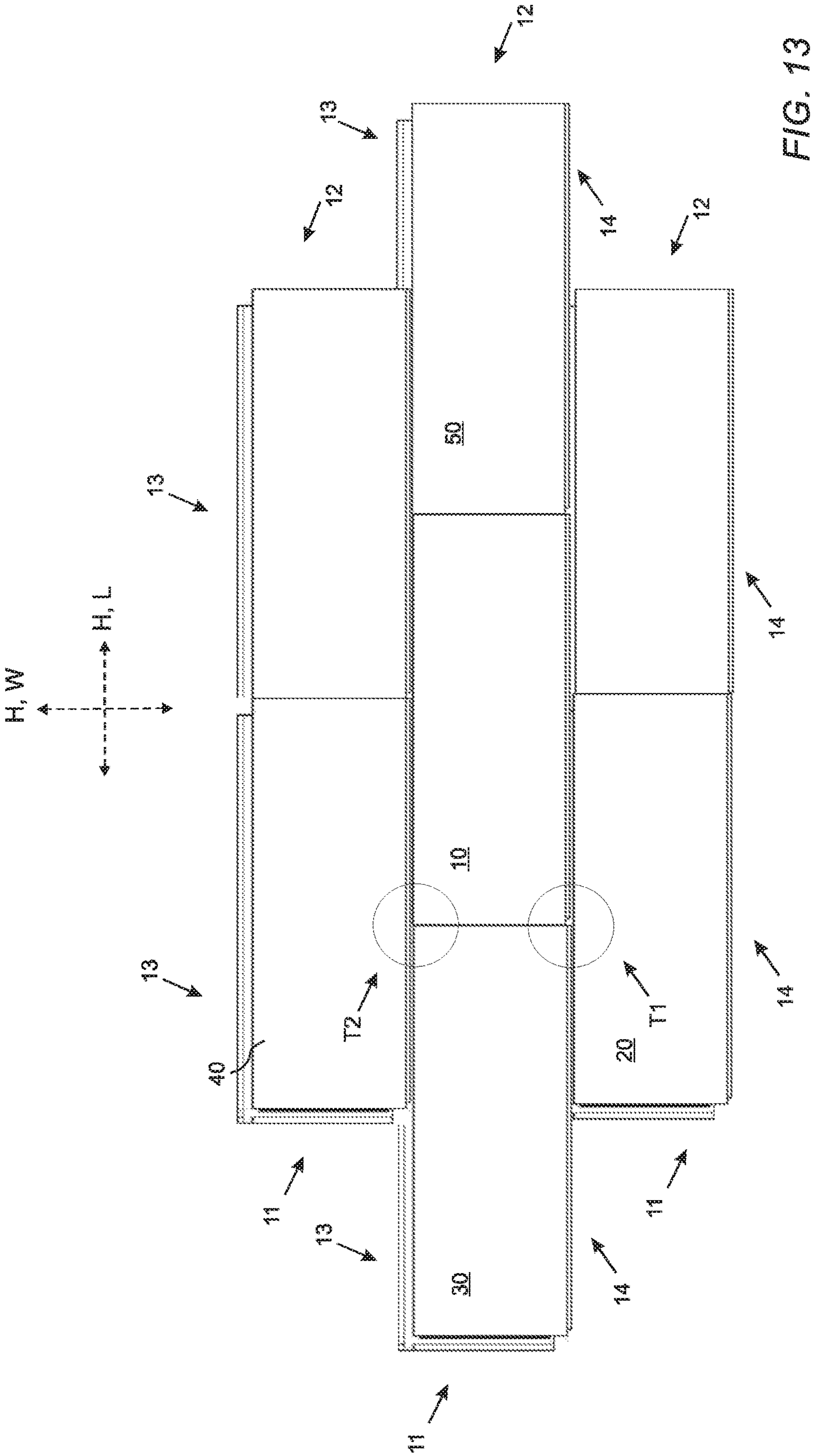
FIG. 13 is a schematic illustration of an exemplary embodiment assembled as a floor.

Referring to FIGS. 12-13, a panel, such as the first panel 10 may be assembled to an adjacent second panel 20 along its long fourth edge 14 by means of the first locking system, e.g. by an angling motion, thereby creating a long-side to long-side joint. The panel 10 may be further assembled with one of its short edges 11 to an adjacent third panel 30 by means of the second locking system, e.g., by vertical folding, thereby creating a short-side to short-side joint, and further assembled with its long third edge 13 to a further fourth panel 40 by means of the first locking system, e.g. by an angling motion, thereby creating a further long-side to long-side joint. The two further panels 20, 40 being arranged on opposite sides of the short-side joint. The resulting configuration of panels is a typical floor lay when assembling e.g. a floating floor as shown in FIG. 13 or a wall, as shown in FIG. 12. As derivable, the configuration comprises two T-joints. Each T-joint comprising a long-side to long-side joint (between a third edge 13 and a fourth edge 14) and a short-side to short-side joint (between a first edge 11 and a second edge 12). Thus, the set of similar or essentially identical panels can be assembled in locking position to comprise a first T-joint T1 and a second T-joint T2, as shown for instance in FIG. 13.

In order to improve the sealing between assembled lay of panels comprising a panel assembled in locking position on all four sides i.e. all four edges, such as a floor lay (see FIG. 13), it would be desirable to improve the water protection of both T-joints.

Thanks to the building panel having the features set forth herein, and in the appended claims, it may be facilitated that the sealing of both T-joints T1 and T2 is improved.

FIG. 6 further shows a preferred embodiment, wherein the first locking tongue 14*h* and the first upper lip portion 149 may be configured to form a tight fit around the first lower lip portion 139 when the first lower lip portion 139 is received under the first upper lip portion 149 in response to a folding displacement of the first panel 10 about the third edge 13 thereof.

The first locking tongue 14*h* of the fourth edge 14 of the first panel 10 is configured to be received in the tongue groove 13*j* of the third edge 13 of the adjacent panel 20 in response to said folding displacement of the first panel about the third edge 13 thereof.

The first locking tongue 14*h* and the first upper lip portion 149 of the fourth edge 14 may be configured to form a tight fit around the first lower lip portion 139 when the first lower lip portion 139 is received under the first upper lip portion 149 in response to said folding displacement.

The fourth edge may comprise a third tongue groove 14*n* formed between the first upper lip portion 149 and the first locking tongue 14*h*. The third tongue groove 14*n* may open in a direction parallel the front surface 15 of the panel. The third tongue groove 14*n* may be configured to receive the third locking tongue 13*m* of a third edge of an adjacent panel in response to said folding displacement of the first panel 10. The third locking tongue 13*m* may be formed between the first tongue groove 13*j* and the first upper lip portion 139.

The third tongue groove 14*n* may be configured to receive the third locking tongue 13*m* in response to or by means of an angling or pivoting displacement of the first panel 10 about the fourth edge 14 thereof, such about an axis extending parallel the longitudinal axis L of the panel.

The first lower lip portion 139 and first upper lip portion 149 may be arranged in parallel abutment in response to or by means of an angling or pivoting displacement of the first panel 10 about the fourth edge 14 thereof, such about an axis extending parallel the longitudinal axis L of the panel.

A first dimension d1 extends in a vertical direction between an upper surface of the tongue groove 13*j* and the first lower lip portion 139, preferably a planar surface thereof.

A second dimension d2 extends between in a vertical direction between an upper surface of the first locking tongue 14*h* and the first upper lip portion 149.

The first dimension d1 and the second dimension d2 may be dimensioned to provide an interference fit when the third locking tongue 13*m* is received in the third tongue groove 14*n*.

The second dimension d2 may be 0 to 0.15 mm smaller than the first dimension d1, for example 0.01 to 0.15 mm smaller, preferably 0.01 to 0.07 mm, more preferably 0.02 to 0.05 mm.

The first dimension d1 and the second dimension d2 may be configured to form a tight fit around the first lower lip portion 139 when the first lower lip portion 139 is received under the first upper lip portion 149 in response to said folding displacement. For example, the first dimension d1 and the second dimension d2 may be the same dimension. For example, the second dimension d2 may be configured with a negative tolerance in relation to the first dimension d1. For example, the first dimension d1 may be slightly larger than the second dimension d2, such a 0.1-10% larger, such as 0.1-3% larger.

The dimensions may be sized to take into consideration any after-treatment such as vax, which may be applied to the first lower lip portion 139 and/or first upper lip portion.

The first locking tongue 14*h* and/or the first upper lip portion 149 may flex in response to receiving the third locking tongue 13*m*. For example, the outermost portion of the first upper lip portion 149 may move, relative to its relaxed position from 0.1 to 0.15 mm. For example, the outermost portion of the first locking tongue 14*h* may move, relative to its relaxed position from 0.1 to 0.15 mm.

The first upper lip portion 149 may thereby be biased towards the first lower lip portion 139 when a respective third edge 13 and fourth edge 14 are assembled in locking position. That is, there may be a pressure on the third locking tongue 13*m* exerted by the first upper lip portion 149 and the first locking tongue 14*h*.

Figure 14A:
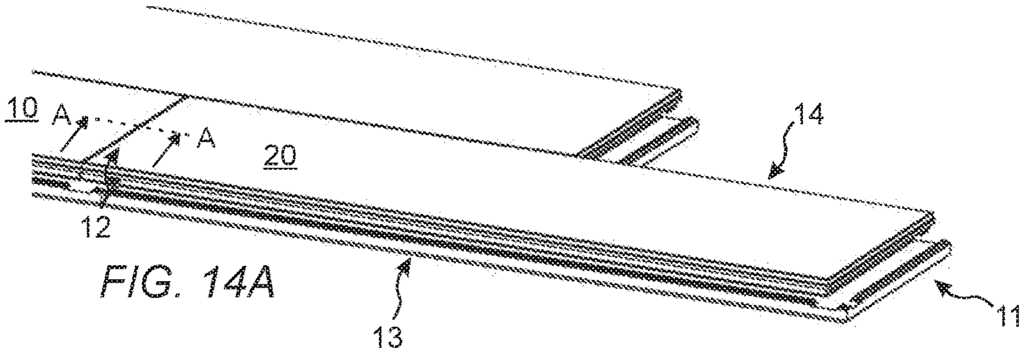
FIG. 14A is a perspective view of a panel according to an embodiment.
Figure 14B:
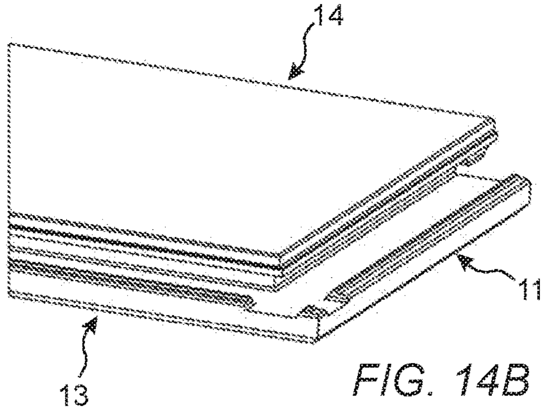
FIG. 14B is a detailed view of the embodiment of FIG. 14A.
Figure 14C:
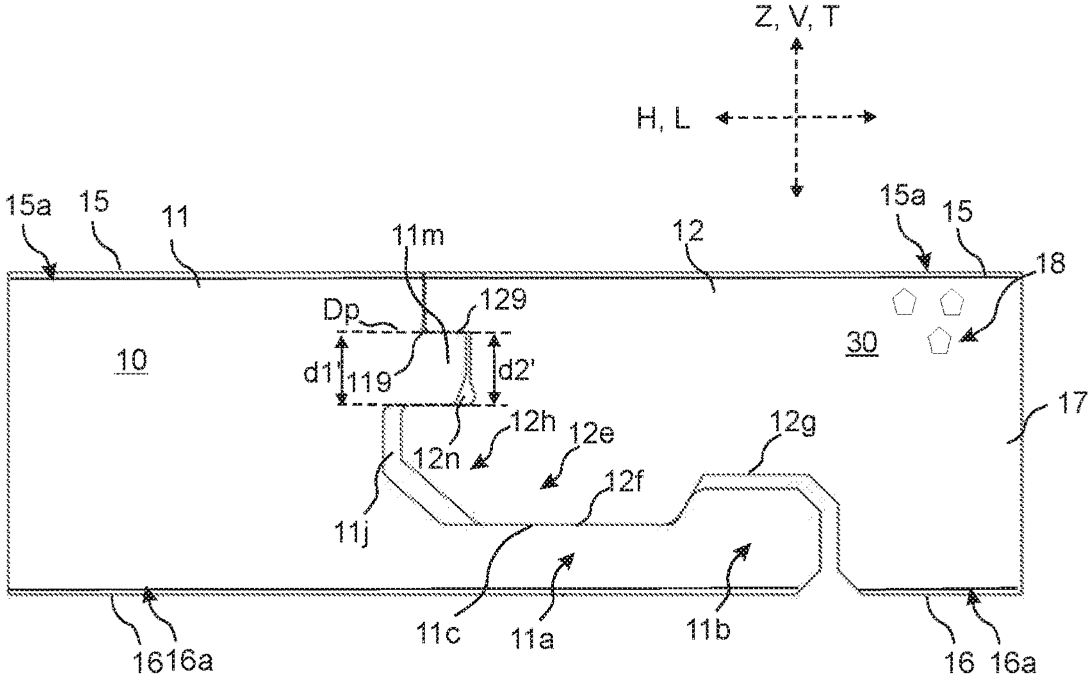
FIG. 14C is a cross-sectional view of the embodiment of FIG. 14A.

In one embodiment the first edge 11 and the second edge 12 comprises the first locking system as explained herein in relation to the third edge 13 and the fourth edge 14, it should thus be appreciated that the first edge 11 may comprise a corresponding third locking tongue 11*m* and the second edge a corresponding third tongue groove 12*n*. Such embodiment is shown FIGS. 14A-14C. Accordingly, in the embodiment of FIGS. 14A-14C, the second dimension d2' may be 0.01 to 0.15 mm smaller than the first dimension d1', preferably 0.01 to 0.07 mm, more preferably 0.02 to 0.05 mm.

Items

ITEM 1. A set of similar or essentially identical building panels, such as a floor panels or wall panels, comprising a first mechanical locking system at respective parallel and opposite third and fourth edges 13, 14, being long edges of the panel, the first mechanical locking system comprising at the third edge 13 a locking groove 13*j* configured to receive a first locking tongue 14*h* of a fourth edge of an adjacent panel by means of a folding displacement of the adjacent panel 20 for horizontal and vertical locking between two adjacent building panels 10, 20, preferably by means of a folding motion, and a second mechanical locking system at respective parallel and opposite first and second edges 11, 12, such as short edges of the panel, configured to cooperate for horizontal and vertical locking of two adjacent building panels 10, 30, preferably by means of a vertical motion, such as vertical folding, wherein an upper edge portion of one of the third edge or fourth edge 13, 14, preferably the third edge 13, comprises a first lower lip portion 139 configured to cooperate with a first upper lip portion 149 of an upper edge portion of the other of the third and fourth edge of an adjacent panel 20 when said third and fourth edges are assembled in locking position, wherein the first upper lip portion 149 of the fourth edge 14 is configured to form a tight fit around the first lower lip portion 139 when the first lower lip portion 139 is received under the first upper lip portion 149 in response to said folding displacement.

ITEM 2. The set according to claim 1, wherein the fourth edge comprises a third tongue groove 14*n* formed between the first upper lip portion 149 and the first locking tongue 14*h*, the third tongue groove 14*n* being configured to receive a third locking tongue 13*m* of a third edge 13 of an adjacent panel in response to said folding displacement of the first panel 10, wherein the third locking tongue 13*m* is formed between the first tongue groove 13*j* and the first upper lip portion 139.

ITEM 3. The set according to any one of the preceding claims, wherein the third tongue groove 14*n* is configured to receive the third locking tongue 13*m* in by means of a folding displacement of the adjacent panel about the fourth edge 14 thereof.

ITEM 4. The set according to any one of the preceding claims, wherein a first dimension d1 extends in a vertical direction between an upper surface of the first tongue groove 13*j* and the first lower lip portion 139, preferably a planar surface thereof, and wherein a second dimension d2 extends between in a vertical direction between an upper surface of the first locking tongue 14*h* and the first upper lip portion 149.

ITEM 5. The set according to claim 4, wherein the second dimension d2 is 0.01 to 0.15 mm smaller than the first dimension d1, preferably 0.01 to 0.07 mm, more preferably 0.02 to 0.05 mm.

ITEM 6. The set according to claim 4 or 5, wherein the first dimension d1 and the second dimension d2 is dimensioned to provide an interference fit when the third locking tongue 13*m* is received in the third tongue groove 14*n*.

ITEM 7. The set according to any one of the preceding claims 4 to 6, wherein the first dimension d1 and the second dimension d2 are configured to form a tight fit around the first lower lip portion 139 when the first lower lip portion 139 is received under the first upper lip portion 149 in response to said folding displacement.

ITEM 8. The set according to any one of the preceding claims 4 to 7, wherein the second dimension d2 is configured with a negative tolerance in relation to the first dimension d1.

ITEM 9. The set according to any one of the preceding claims 4 to 8, wherein the second dimension d2 is configured to be under-dimensioned in relation to the first dimension d1.

ITEM 10. The set according to any one of the preceding claims 4 to 9, wherein the first locking tongue (14*h*) and/or the first upper lip portion 149 are configured to flex in response to receiving the third locking tongue 13*m*.

ITEM 11. The set according to any one of the preceding claims, wherein the second mechanical locking system is essentially identical the first mechanical locking system.

ITEM 12. The set according to any one of the preceding claims, wherein an upper edge portion of one of the first edge 11 or the second edge 12 comprises a second lower lip portion 119 configured to cooperate which a second upper lip portion 129 of an upper edge portion of the other of the first and second edge of an adjacent panel 30 when said first and second edges are assembled in locking position, preferably by means of vertical displacement of the second edge 12 of an adjacent panel 30 relative the first edge 11.

ITEM 13. The set according to the preceding claim, wherein the second mechanical locking system comprises at the first edge 11 a second locking groove 11*j* configured to receive a second locking tongue 12*h* of a second edge of an adjacent panel by means of a folding displacement of the adjacent panel for vertical locking between the first edge 11 and a second edge 12 of an adjacent building panel 10, 30, wherein the second locking tongue 12*h* and the second upper lip portion 129 of the second edge 12 are configured to form a tight fit around the second lower lip portion 119 when the second lower lip portion 119 is received under the second upper lip portion 129 in response to a folding displacement of the adjacent panel 30 about the second edge 12 thereof.

ITEM 14. The set according to claim 13, wherein a first dimension d1' extends in a vertical direction between an upper surface of the second tongue groove 11*j* and the first lower lip portion 119, preferably a planar surface thereof, and wherein a second dimension d2' extends between in a vertical direction between an upper surface of the second locking tongue 12*h* and the second upper lip portion 129.

ITEM 15. The set according to claim 14, wherein the second dimension d2' is 0.01 to 0.15 mm smaller than the first dimension d1', preferably 0.01 to 0.07 mm, more preferably 0.02 to 0.05 mm.

ITEM 16. The set according to claim 14 or 15, wherein the first dimension d1' and the second dimension (d2') are dimensioned to provide an interference fit when the second lower lip portion 119 is received under the second upper lip portion 129 in response to said folding displacement.

ITEM 17. The set according to any one of the preceding claims 14 to 16, wherein the second dimension d2' is configured to be under-dimensioned in relation to the first dimension d1'.

ITEM 18. The set according to any one of the preceding claims 14 to 17, wherein the second locking tongue 12*h* and/or the second upper lip portion 129 are configured to flex in response to receiving the second lower lip portion 119.

ITEM 19. The set according to any one of the preceding claims, wherein said tight fit is obtained before and/or after treatment of the panel, such as a sealant applied to one or more of the lower lip portions 139, 119 and/or the one or more of the upper lip portions 149, 139.

ITEM 20. The set according to any one of the preceding items, wherein the lip portions 119, 129, 139, 149 each of comprises a planar horizontal surface.

ITEM 21. The set according to any one of the preceding items, wherein the first lower lip portion 139 is continuous with the second lower lip portion 119, preferably the first upper lip portion 149 is continuous with the second upper lip portion 129.

ITEM 22. The set according to any one of the preceding items, wherein said lip portions 119, 129, 139, 149 continuously define a datum plane Dp, preferably along the first, second, third and fourth edges when a panel is assembled with similar panels in locking position along all edges 11, 12, 13, 14.

ITEM 23. The set according to any one of the preceding items, wherein said lip portions 119, 129, 139, 149 are contiguous with each other such as to extend continuously along the first, second, third and fourth edges.

ITEM 24. The set according to any one of the preceding items, wherein the first upper lip portion 149 is configured to bear on the first lower lip portion 139 when adjacent panels are assembled in locking position by means of the first locking system.

ITEM 25. The set according to any one of the preceding items, wherein the second upper lip portion 129 is configured to bear on the second lower lip portion 119 when adjacent panels are assembled in locking position by means of the second locking system.

ITEM 26. The set according to any one of the preceding items, wherein the first and locking systems each comprises a locking tongue 11*i*, 12*h*, 14*h* and a tongue groove 11*j*, 12*j*, 13*j*, wherein said lip portions 119, 129, 139, 149 are disposed between a respective of said locking tongue or tongue groove and the front surface 15 of the panel.

ITEM 27. The set according to any one of the preceding items, wherein an upper edge portion of the second edge 12 and/or fourth edge 14, comprises a vertically extending edge portion extending from the front surface 15 followed by a contiguous bend inwards towards a centre of the panel, preferably said bend is followed by a horizontal planar surface.

ITEM 28. The set according to any one of the preceding items, wherein an upper edge portion of the first edge 11 and/or third edge 13 comprises a vertically extending edge portion extending from the front surface 15 followed by a contiguous bend outwards away from the centre of the panel, preferably said bend is followed by a horizontal planar surface.

ITEM 29. The set according to any one of the preceding items, wherein said bend comprises a right-angle bend.

ITEM 30. The set according to any one of the preceding items, wherein the first lower lip portion 139 is continuous with the second lower lip portion 119.

ITEM 31. The set according to any one of the preceding items, wherein the first upper lip portion 149 is continuous with the second upper lip portion 129.

ITEM 32. The set according to any one of the preceding items, wherein the second lower lip portion 119 is contiguous the first upper lip portion 149.

ITEM 33. The set according to any one of the preceding items, wherein the second upper lip portion 129 is contiguous with the first lower lip portion 139.

ITEM 34. The set according to any one of the preceding items, wherein said first and second upper and lower lip portions 119, 129, 139, 149 defines a datum plane Dp for aligning the front surface 15 of the building panel with the front surface (15) of an adjacent building panel.

ITEM 35. The set according to any one of the preceding items, wherein one of the first or second edges comprises a second locking tongue 11*i*, such as a displaceable locking tongue configured to linearly translate in a displacement groove 11*k*, and the other of the first and second edges comprises a second tongue groove 12*j* for receiving said second locking tongue, wherein the lip portions 119, 129, 139, 149 are disposed between first tongue groove the front surface 15 of the panel.

ITEM 36. The set according to any one of the preceding items, wherein said lip portions 119, 129, 139, 149 are contiguous with each other, preferably continuously extending along the first, second, third and fourth edges and/or continuously define the datum plane Dp along the first, second, third and fourth edges when a panel is assembled with similar panels in locking position along all edges 11, 12, 13, 14.

ITEM 37. The set according to any one of the preceding items, wherein the first, second, third and fourth lip portions essentially extend in a common plane.

ITEM 38. The set according to any one of the preceding items, wherein the panel comprises a surface layer 15*a*, said surface layer comprising a binder, such as a thermosetting resin.

ITEM 39. The set according to the preceding item, wherein said binder 18 has a penetration depth into a core 17 of the panel in a direction transverse the front surface 15.

ITEM 40. The set according to the preceding item, wherein said penetration depth extends to and including at least part of the lip portions.

ITEM 41. The set according to any one of the preceding claims 38 to 40, wherein the surface layer 15*a* is a protective surface layer and/or a decorative surface layer.

ITEM 42. The set according to any one of the preceding items 38 to 41, wherein the surface layer 15*a* comprises one or more of a veneer, pigments, cellulose fiber.

ITEM 43. The set according to any one of the preceding items 38 to 42, wherein the binder comprises a thermosetting, such as melamine formaldehyde.

ITEM 44. The set according to any one of the preceding claims 38 to 43, wherein said core 17 comprises one or more of MDF, HDF, wood, stone, ceramics, PVC, plastics.

The invention claimed is:

1. A set of similar or essentially identical building panels, comprising:

a first mechanical locking system at respective parallel and opposite third and fourth edges, being long edges of the panels, the first mechanical locking system comprising, at the third edge, a first tongue groove configured to receive a first locking tongue of a fourth edge of an adjacent panel by a folding displacement of the adjacent panel for horizontal and vertical locking between two adjacent building panels, and a second mechanical locking system at respective parallel and opposite first and second edges, being short edges of the panel shorter than or equal to the long edges of the panel, configured to cooperate for horizontal and vertical locking of two adjacent building panels, wherein an upper edge portion of the third edge comprises a first lower lip portion configured to cooperate with a first upper lip portion of an upper edge portion of the fourth edge of an adjacent panel when said third and fourth edges are assembled in a locking position, wherein a first dimension extends in a vertical direction between an upper surface of the first tongue groove and the first lower lip portion, and wherein a second dimension extends in the vertical direction between an upper surface of the first locking tongue and the first upper lip portion, and wherein the second dimension is smaller than or equal to the first dimension.

2. The set according to claim 1, wherein the first upper lip portion is biased toward the first lower lip portion when the third edge and the fourth edge are assembled in the locking position.

3. The set according to claim 1, wherein the second dimension is smaller than the first dimension.

4. The set according to claim 1, wherein the first dimension and the second dimension are equal.

5. The set according to claim 1, wherein the second dimension is 0 to 0.15 mm smaller than the first dimension.

6. The set according to claim 1, wherein the second dimension is 0.01 to 0.15 mm smaller than the first dimension.

7. The set according to claim 1, wherein the second dimension is 0.01 to 0.07 mm smaller than the first dimension.

8. The set according to claim 1, wherein the second dimension is 0.02 to 0.05 mm smaller than the first dimension.

9. The set according to claim 1, wherein the first dimension is 0.1-10% larger than the second dimension.

10. The set according to claim 1, wherein the first dimension is 0.1-3% larger than the second dimension.

11. The set according to claim 1, wherein the first upper lip portion is configured to form a tight fit against the first lower lip portion when the first lower lip portion is received under the first upper lip portion in response to said folding displacement.

12. The set according to claim 1, wherein the first and second dimensions are dimensioned to provide an interference fit when the first lower lip portion cooperates with the first upper lip portion in response to said folding displacement.

13. The set according to claim 1, wherein the first locking tongue is configured to flex in response to the first lower lip portion cooperating with the first upper lip portion.

14. The set according to claim 1, wherein the first upper lip portion is configured to flex in response to the first lower lip portion cooperating with the first upper lip portion.

15. The set according to claim 1, wherein the second dimension is configured with a negative tolerance in relation to the first dimension.

16. The set according to claim 1, wherein the first dimension includes a thickness of after-treatment applied on the third edge.

17. The set according to claim 1, wherein the second dimension includes a thickness of after-treatment applied on the fourth edge.

18. A method of locking a set of similar or essentially identical building panels, the building panels including a panel and an adjacent panel, the method comprising:

performing a folding relative displacement between the panel and the adjacent panel to lock a first mechanical locking system located at respective parallel and opposite third and fourth edges, the third edge being an edge of the panel and the fourth edge being an edge of the adjacent panel, the first mechanical locking system comprising, at the third edge of the panel, a first tongue groove configured to receive a first locking tongue of the fourth edge of the adjacent panel by the folding relative displacement for horizontal and vertical locking between the panel and the adjacent panel, and wherein the set of panels further include a second mechanical locking system at respective parallel and opposite first and second edges configured to cooperate for horizontal and vertical locking, wherein an upper edge portion of the third edge comprises a first lower lip portion which cooperates with a first upper lip portion of an upper edge portion of the fourth edge of the adjacent panel when said third and fourth edges are assembled in a locking position, wherein a first dimension extends in a vertical direction between an upper surface of the first tongue groove and the first lower lip portion, and wherein a second dimension extends in the vertical direction between an upper surface of the first locking tongue and the first upper lip portion, and wherein the second dimension is smaller than or equal to the first dimension.

19. The method according to claim 18, wherein the folding relative displacement causes the first upper lip portion to form a tight fit against the first lower lip portion when the first lower lip portion is received under the first upper lip portion.

* * * * *